Nov. 17, 1953  W. A. MEIER  2,659,222
COMPOTIER
Filed Aug. 26, 1950  2 Sheets-Sheet 1
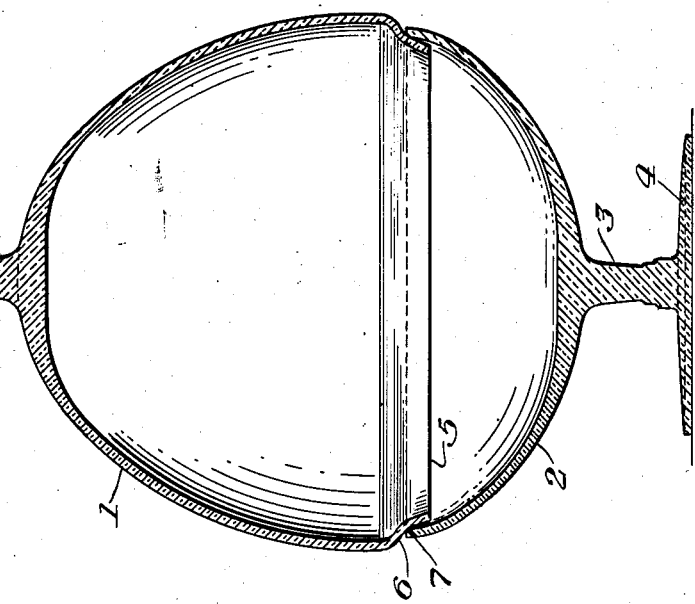
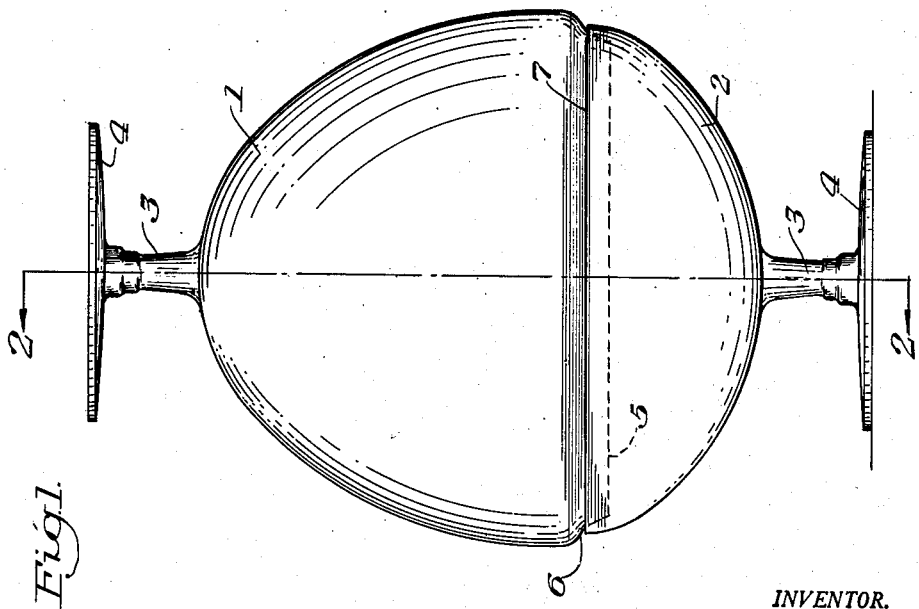
INVENTOR.
William A. Meier.
BY
William D. Carothers
HIS ATTORNEY.

Nov. 17, 1953 W. A. MEIER 2,659,222
COMPOTIER
Filed Aug. 26, 1950 2 Sheets-Sheet 2
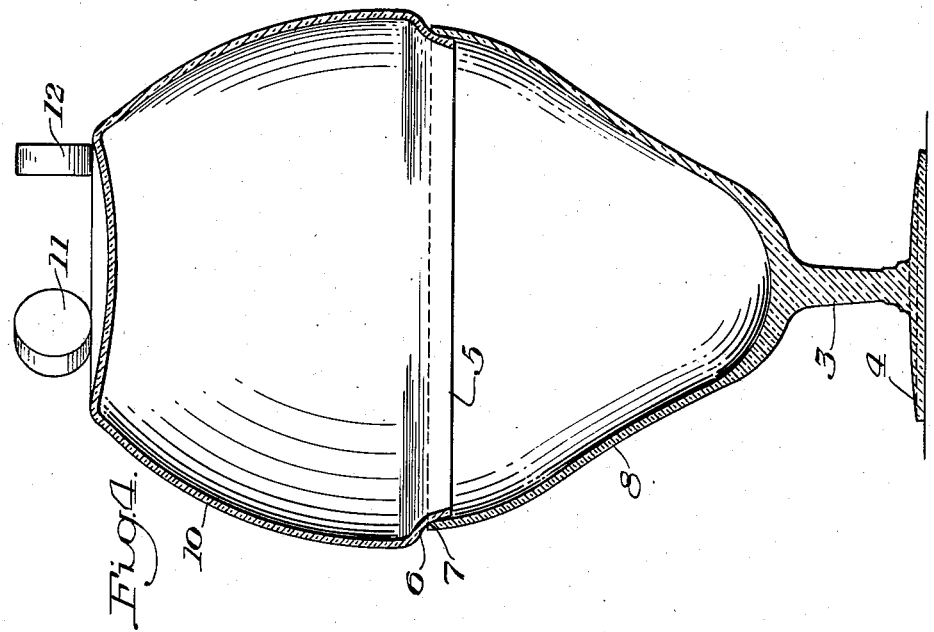
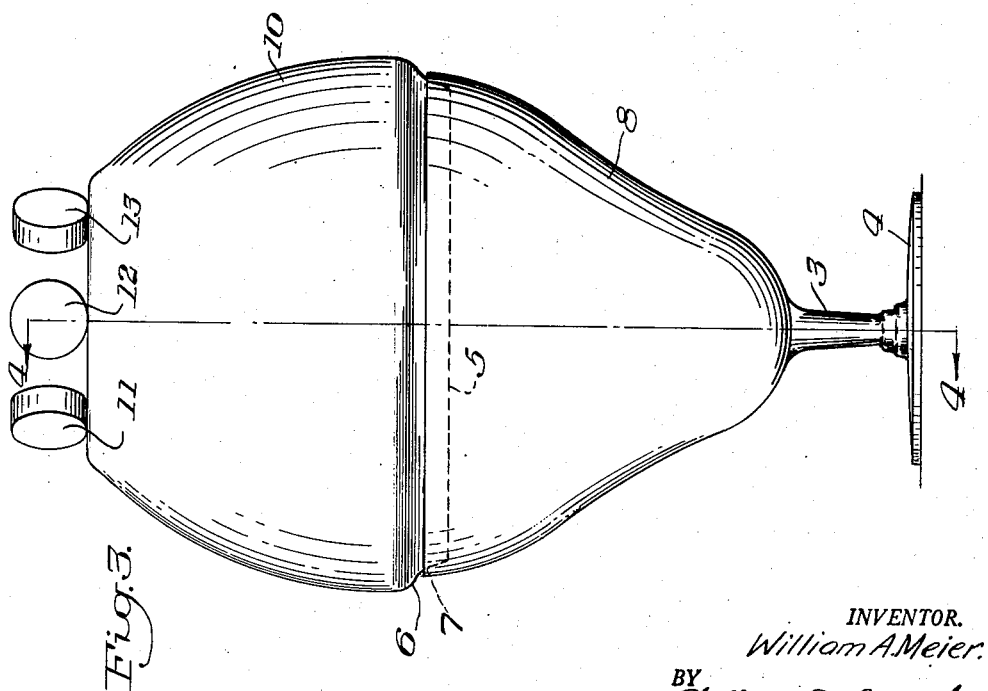
INVENTOR.
William A. Meier.
BY
William D. Carothers
HIS ATTORNEY.

Patented Nov. 17, 1953

2,659,222

UNITED STATES PATENT OFFICE 2,659,222

COMPOTIER

William Alfred Meier, Rochester, Pa.

Application August 26, 1950, Serial No. 181,634

1 Claim. (Cl. 65—59)

This invention relates generally to table and decorative ware and more particularly to a covered dish such as a compotier.

Covered dishes such as tureens and compotiers have a lower dish portion and a lid. The dish portions vary in size, shape and decoration, and the lids are ordinarily constructed to match but are provided with a central handle to lift it from the dish. When the lid is raised it must set resting on one side and the handle and sloping at an angle. Owing to the fact that the handle is merely a knob, loop or other similar decorative grasping part, the lid has to rest on its side and has no utility other than to function as a lid or cover. When not in use the lid is invariably in the way.

The principal object of this invention is the provision of a lid or cover of a tureen or compotier or other similar dish which has a foot or other character of supporting base that can be used as a handle and for supporting the lid or cover converting it into a dish that has utility. The lid or cover may have a very similar appearance to that of the dish itself. It may be the same size or even a duplicate of the dish and may be referred to as a duplicate dish or a cover dish. The cover dish of a tureen may be used for serving the same or a different food and when the service is gone, one part may be placed over the other in the usual manner to conserve space at the table.

Another important feature of this invention is in its use for small or individual portions in serving. The smaller dish may be sufficiently large to contain two portions of the food and then the cover is placed thereover and is ready to serve to the table. The dual dish takes less room on the serving tray. It keeps the food covered from contamination and it aids in retaining its heat if the food is being served hot. Thus many advantages are obtained by the use of the dishes comprising this invention.

After the food has been served to the table, the dual portions may be divided and served individually; one portion in the dish, the other in the cover thus utilizing the latter as a service dish.

The stem and foot or other type of base employed on the cover provides a handle for raising and otherwise manipulating the cover. A cluster of three disks provides a good base and also a handle. The particular design of the base or foot of the cover and the dish will, of course, vary with the ideas of the designer, and they may be made in very attractive patterns, but they should provide a substantial base for converting the cover into a dish.

Other objects and advantages appear hereinafter in the following description and claim.

The accompanying drawings show, for the purpose of exemplification without limiting the invention or claim thereto, certain practical embodiments of the invention wherein:

Fig. 1 is a view in side elevation of one form of covered dish comprising this invention.

Fig. 2 is a sectional view taken on the line 2—2 of Fig. 1.

Fig. 3 is a side elevation of another form of covered dish.

Fig. 4 is a sectional view taken on the line 4—4 of Fig. 3.

Referring to the drawings it will be observed in Figs. 1 and 2 that the compotier having a dish portion 1 and a cover portion 2 each of which is provided with a stem 3 and a base 4 on the order of a goblet stem. In each instance the stem is made integral with the body of the dish members.

A dish member 1, although illustrated in its inverted form, may contain the serving and the cover member 2 being smaller may be placed thereover. It is preferable to provide an inturned lip or shoulder, such as illustrated at 5 and 6, to receive the annular rim 7 of the lid member 2. This particular form of shoulder and seating rim need not be selected for this use.

However, it is preferable to have some form of interlocking shoulder engagement such as ordinarily found on tureens and other similar covered dishes which generally have a horizontal flange with a downwardly depending flange integral therewith arranged to fit into the dish. This is one reason why the compotiers were shown inverted so as to illustrate the manner in which the top or cover member can be constructed in the manner very similar to that of tureens or present compotiers without slipping or otherwise becoming disengaged.

The particular design as shown in Figs. 1 and 2 is named the "apple design" wherein the cover member 2 is materially smaller in size and volume than the actual dish member 1. When serving food ordinarily the compotier would be inverted and the second dish member 1 would contain the serving portion and the cover member 2 would be placed thereover and, when served on the table and the cover member removed, the serving would be divided, a portion thereof being left in the dish member 1 and the other portion being transferred to the cover member 2 which itself becomes a dish member. Again when the dishes are being removed from the table the cover member 2 may be placed on the dish member 1 or vice versa, as illustrated in the drawings, to empty any residue to the lower dish so it may be carried from the table on a tray thereby conserving space.

The structure, as shown in Figs. 3 and 4, illustrates a pear-shaped design in a compotier wherein the dish member 8 and the cover member 10 are substantially equal in height and have substantially the same capacity and in fact the cover member 10 may be considered as a dish member if desired. The dish member 8 is provided with a stem 3 and having a foot 4 in the same manner as that shown in Figs. 1 and 2. The cover member 10 is provided with the depending flange 5 and a shoulder 6 which is engaged by the annular rim 7 in the same manner as that as illustrated in Figs. 1 and 2.

These compotiers may be constructed of glass, ceramic, woodenware, stoneware, or any metal or plastic and are readily made with this type of interengaging flange and shoulder combination as illustrated. The cover member 10, as shown in Figs. 3 and 4, is provided with three disks, each sphere being positioned 120 degrees from the other disk so as to provide a uniformly arranged base on which the cover member 10 may be set when removed from the dish member 8 and placed on the surface of the table. The three spheres may provide a color combination as well as a grasping means and are spaced sufficiently apart so as to provide ample stability to function efficiently as a cover member if member 8 is to be utilized as a dish.

Covered dishes of this character, the compotier or tureen or other similar dish, may have duplicated covers and bases. By providing such duplicated dishes one may decrease the time for serving large numbers of people by having the dish member contain two portions or servings and being covered by the cover portion which in turn becomes a dish portion and receives the serving as they are carried to the table.

While for clarity of explanation certain embodiments of this invention have been shown and described it is to be understood that this invention is capable of many modifications, and changes in the construction and arrangement may be made therein and certain parts may be employed with the conjoint use of other parts and without departing from the spirit and scope of this invention.

I claim:

In a compotier, a composite structure comprising upper and lower hollow bowl members adapted to form a closed vessel or to be employed independently of each other, a peripheral rim on one bowl member having angular intersecting surfaces forming a large obtuse angle and defined by two conical surfaces, one an inwardly sloping conical surface and the other an upwardly extending conical surface terminating at the edge of the rim, an annular rim on the other bowl member engaging said conical surface below the juncture of the angular intersecting conical surfaces, means for supporting each member when the latter are disassembled for separate use, said supporting means for at least one of said members including an integral stem portion and a foot portion on the end of the stem portion spaced from the bowl member, said stem portion and foot portion requiring only one hand to lift it off its foot portion and invert it to position the second named rim on the angular intersecting conical surfaces of the first named rim on said one bowl member.

WILLIAM ALFRED MEIER.

References Cited in the file of this patent

UNITED STATES PATENTS

| Number | Name | Date |
|---|---|---|
| D. 10,122 | Steinhardt | July 24, 1877 |
| D. 10,296 | Jones | Nov. 6, 1877 |
| 138,503 | King | May 6, 1873 |
| 181,037 | Campbell | Aug. 15, 1876 |
| 305,674 | Dalzell | Sept. 23, 1884 |
| 315,462 | Bennett | Apr. 14, 1885 |
| 600,427 | Jones, Jr. | Mar. 8, 1898 |
| 670,261 | Watz | Mar. 19, 1901 |
| 809,567 | Henckel | Jan. 9, 1906 |
| 1,200,990 | Rooney | Oct. 10, 1916 |
| 1,236,058 | Crowe | Aug. 7, 1917 |
| 1,467,888 | Watts et al. | Sept. 11, 1923 |
| 1,509,524 | Morrison | Sept. 23, 1924 |
| 2,203,647 | Cunningham | June 4, 1940 |

FOREIGN PATENTS

| Number | Country | Date |
|---|---|---|
| 13,965 | Great Britain | June 17, 1913 |
| 286,873 | Great Britain | Mar. 15, 1928 |
| 445,407 | Germany | June 7, 1927 |